United States Patent [19]

Hayashi

[11] 3,738,747
[45] June 12, 1973

[54] CONTINUOUS FEED COPYING MACHINE WITH AN ELECTRONIC FLASH ILLUMINATION SYSTEM

[75] Inventor: Masamichi Hayashi, Minamishidaro-gun, Aichi-ken, Japan

[73] Assignee: Minolta Camera Kabushiki Kaisha, Osaka-shi, Japan

[22] Filed: May 14, 1971

[21] Appl. No.: 143,518

[30] Foreign Application Priority Data
May 14, 1970 Japan.................................. 45/47480

[52] U.S. Cl. ............. 355/68, 95/10 CE, 95/11.5 R, 355/69
[51] Int. Cl. .............................................. G03b 27/72
[58] Field of Search ........................ 355/55, 67, 68; 95/11.5 R; 240/1.3

[56] References Cited
UNITED STATES PATENTS
3,549,254    12/1970    Muir.................................... 355/55
3,521,540    7/1970     Cavallo............................ 95/11.5 R
2,508,242    5/1950     Stein.................................. 240/1.3

Primary Examiner—Samuel S. Matthews
Assistant Examiner—Rossell E. Adams, Jr.
Attorney—Watson, Cole, Grindle & Watson

[57] ABSTRACT

A copy machine having an electronic flash illumination system is disclosed. The electronic flash is activated when a photosensitive device detects a light sensitive sheet of copy paper in the proper exposure position. The exposure takes place as both the original and copy sheets are moving in synchronism. The photosensitive device and an illumination device for detecting the copy paper are normally constructed to operate in a region of the spectrum to which the copy paper is insensitive.

3 Claims, 2 Drawing Figures

FIG. I

CONTINUOUS FEED COPYING MACHINE WITH AN ELECTRONIC FLASH ILLUMINATION SYSTEM

BACKGROUND OF THE INVENTION

The present invention relates to an electronic copying machine in which an instantaneous flashing exposure is carried out by means of an electronic flash system disposed adjacent a carrier path of a photosensitive sheet as the light sensitive sheet is carried through the exposure position, and more particularly to an electronic copying machine which is provided with a device for detecting and controlling the ignition time of the electronic flash system so that the flash is ignited at the instant when the light sensitive sheet is carried into the exposure position by a carrying means.

In an electronic copying machine in the prior art, the running original sheet and the light sensitive sheet are delayed at an exposure position in order to effect an exposure by igniting a halogen lamp or the like, and a micro switch or the like which is actuated by movement of the light sensitive sheet controls such operations as mentioned above, however, such a device in which the original sheet and the light sensitive sheet must be delayed is disadvantageous in that its feeding mechanism is complicated and its copying efficiency is lowered.

In contradistinction thereto, there is a known electronic copying machine in which a light source such as a halogen lamp or a mercury lamp illuminated the light sensitive sheet through a slit in order to carry out an exposure while the original sheet and the photosensitive sheet are moving, however, the copying machine of this kind is defective in that the exposure time must be extended on account of the illumination through a slit and the running speed must be accordingly slowed down, resulting in that the copying efficiency is extremely lowered.

Moreover, there is a proposed electronic copying machine in which the moving original sheet is instantaneously illuminated by the ignition of an electronic flash which is directed to the original sheet and the light sensitive sheet while they are moving together. However, the copying machine of this kind is defective in that uneven exposure or unstable light intensity is always noted because the ignition time of the electronic flash is not accurately synchronized in relation to the exposure position of the moving original sheet, since the ignition time of the electronic flash is too short.

OBJECT OF THE INVENTION

One object of the present invention is to obviate such defects in the prior art as described above and to provide an electronic copying machine comprising an electronic flashing system by means of which a moving original sheet and a moving light sensitive sheet are effectively furnished with an instantaneous exposure, and a device which detects and controls the ignition time of the electronic flashing system so that it is instantaneously lit at the moment when the light sensitive sheet is just located at the exposure position.

Another object of this invention is to provide an electronic copying machine comprising a detecting and controlling device in which a definite position of the moving light sensitive sheet is detected when it passes through a predetermined position within the carrier path by means of an illuminating device which illuminates the rear face of the light sensitive sheet by a spot light and by means of a light receiving element which receives the light beam reflected by the light sensitive sheet, and the output of the detecting means actuates an electronic circuit which controls the ignition time of an electronic flash tube via a thyristor.

Further, objects and advantages of this invention will become apparent from the following detailed description taken in conjunction with the accompanying drawings of an embodiment of the present invention.

SUMMARY OF THE INVENTION

The present invention relates to a flashing type electronic copying machine, wherein a light sensitive sheet entering into a predetermined position within the carrier path of the light sensitive sheet is detected by a detecting means comprising an illuminating device which illuminates the predetermined position by a spot light from the rear side of the moving light sensitive sheet. A light receiving element receives the light beam reflected by the light sensitive sheet at the moment when it enters into the predetermined position. An electronic detecting circuit is actuated by the output of the detecting means, and a trigger signal for an electronic flash tube is applied via an electronic controlling device as a high voltage of the output from the detecting circuit. Thereby the electronic detection of the light sensitive photosensitive sheet entering into a predetermined position and the electronic control thereof based on said detection are instantly carried out, so that the lighting time of the electronic flash tube is accurately controllable on account of the accurate and correct detection of the instant when the original sheet and the light sensitive sheet enter into a correct exposure position. The exposure is carried out while the original sheet and the light sensitive sheet are moving through their respectively regular positions with respect to the electronic flash tube.

DESCRIPTION OF THE PREFERRED EMBODIMENT

Figure 1:
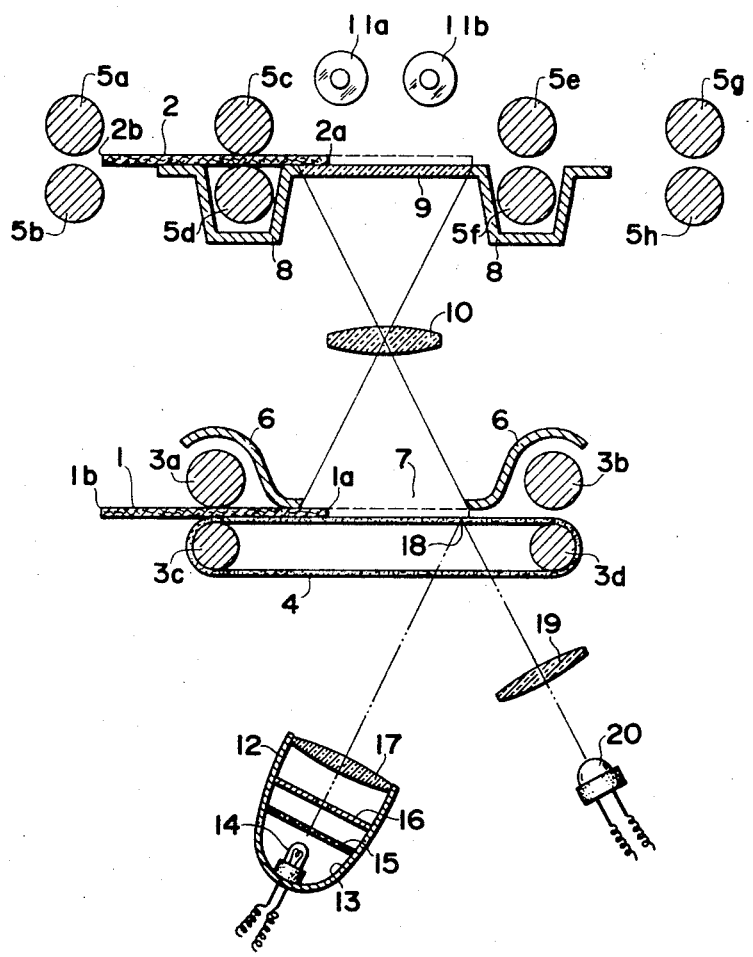
FIG. 1 is a side view, partly in section, of an embodiment of the present invention.

With reference to FIG. 1, a light sensitive sheet 1 and an original sheet 2 are transferred at the same speed through their respective transfer paths by means of photosensitive sheet driving rollers 3a, 3b, 3c and 3d, and original sheet driving rollers 5a, 5b, 5c, 5d, 5e, 5f, 5g and 5h. When the original sheet 2 is carried onto a transparent plate 9 covering an exposure aperture formed on a shielding plate 8, the light sensitive sheet 1 is located at an image aperture 7 formed on a shielding plate 6 so as to be illuminated by the ignition of electronic flash tubes 11a and 11b. An image of the original sheet 2 being thereby exposed on the light sensitive sheet 1 by virtue of a focusing lens 10. A plurality of endless belts 4 are bridged across the photosensitive sheet driving rollers 3c and 3d with some spaces between each belt, thereby, the light sensitive sheet 1 thereon is maintained flat, as well as being assisted in moving thereover.

Nevertheless, as the ignition time of the electronic flash tubes 11a and 11b is only one-thousandth of one second or less, if the flash tubes are not ignited just at the instant the light sensitive sheet 1 and the original sheet 2 are located at the image aperture 7 and on the transparent plate 9 respectively, an uneven exposure might result.

A detecting means which comprises a spot illuminating device 12 and a light receiving element 20 is provided in order to detect the required timing relationship. The spot illuminating device 12 is composed of a lamp 14, a reflecting mirror 13 which reflects the light of the lamp 14, a lens 17 which projects the light beam from the lamp 14 on the rear face of the light sensitive sheet 1, a filter 15 which absorbs the light wave spectrum sensitive to the photosensitive sheet, and an iris diaphragm 16 for forming a spot illumination. Thus, when the photosensitive sheet 1 enters into its best exposure position as shown in chain lines in FIG. 1 for instance, the position 18 of its foremost end 1a is illuminated by the spot illuminating light beam which passes through the spaces between the belts 4.

The illuminating spot beam is reflected by the light sensitive sheet 1 when its foremost end 1a is just at position 18, and the reflected light beam is projected upon a light receiving element 20 by a condenser lens 19 of which the light axis is coincident with the regular reflecting light path thereof, the output current therefrom being accordingly generated therein.

Figure 2:
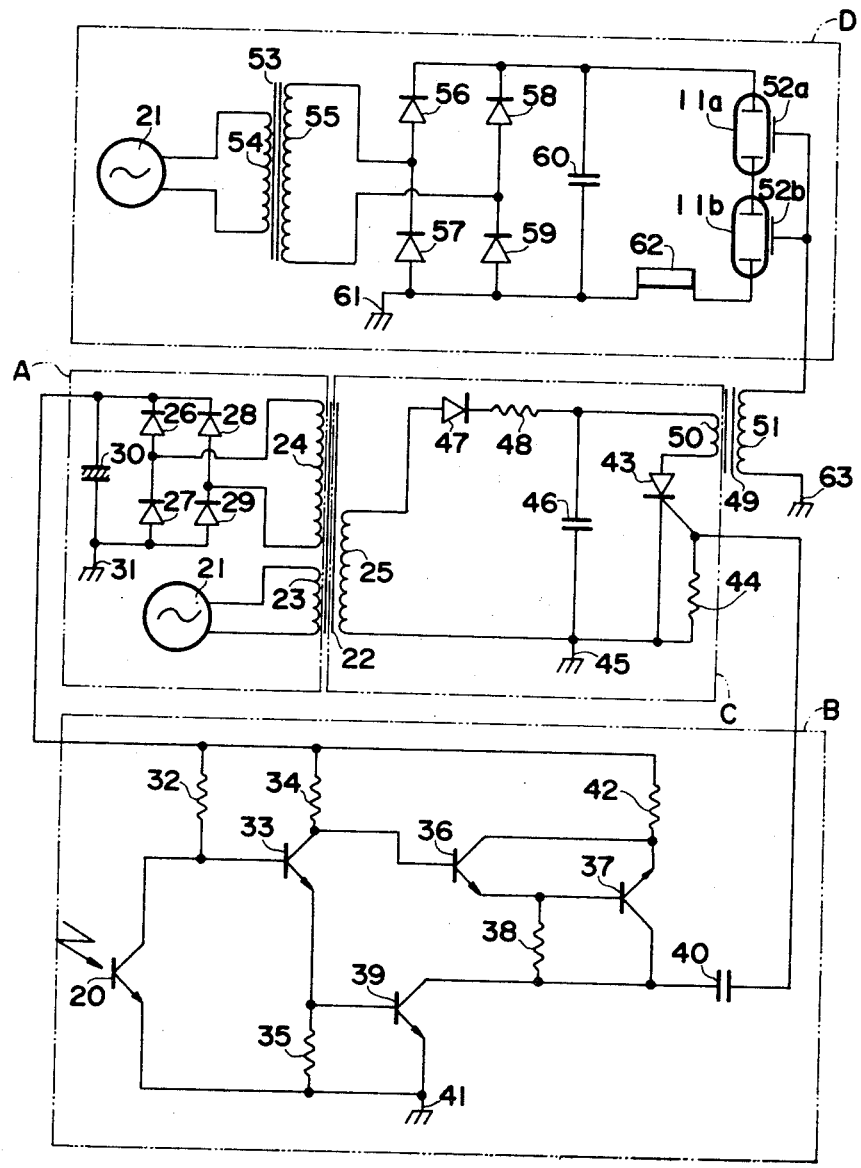
FIG. 2 is a schematic circuit diagram of the controlling circuit of the above embodiment.

FIG. 2 illustrates the electric circuit, which comprises a power source circuit A, a detecting circuit B, a trigger circuit C and an ignition circuit D, each of the four circuits being respectively enclosed by chain lines as seen in the diagram.

The power source circuit A comprises a transformer 22 of which the primary winding 23 is connected to a commercial power source 21, and the output of secondary winding 24 is rectified by means of silicon rectifying elements 26, 27, 28 and 29, and smoothed by a smoothing capacitor 30 of which one terminal 31 is grounded at 31, and then supplied to the detecting circuit B from the other terminal of the capacitor 30. While, the output of a separate secondary wiring 25 of the transformer 22 is applied to trigger circuit C.

In the detecting circuit B, the current of smoothing capacitor 30 is connected via a resistor 32 to the collector of a photo-transistor 20, which is the light receiving element of the aforesaid detecting means, of which the emitter is grounded at 41. Photo-transistor 20 becomes conductive when it receives the reflected light beam.

A transistor 33, having a base connected to the collector of photo-transistor 20, a collector connected not only to smoothing capacitor 30 via a resistor 34 but also to the base of a transistor 36, and an emitter connected to the base of a transistor 39 and grounded via a resistor 35 at 41, is normally non-conductive but switched conductive at the same time when the phototransistor 20 becomes conductive.

The collector of transistor 36 is connected to the emitter of another transistor 37, and its emitter is connected not only to the base of transistor 37 but also via a resistor 38 to both collectors of transistor 37 and transistor 39. The emitter of transistor 39 is grounded at 41, whereas the emitter of transistor 37 is connected via a resistor 42 to smoothing capacitor 30. Both collectors of the transistor 37 and the transistor 39 being provided with a capacitor 40 connected thereto. Both transistors 36 and 37 are normally non-conductive so long as transistor 33 is held non-conductive but they become conductive at the same time when the transistor 33 is switched conductive. Conversely, transistor 39 is conductive so long as the transistor 33 is held non-conductive and it becomes non-conductive when the transistor 33 is switched conductive.

Accordingly, when the foremost end 1a of the photosensitive sheet 1 enters into the position 18 and the light beam reflected thereat is projected upon the photo-transistor 20, the current from the smoothing capacitor 30 charges the capacitor 40 through the resistor 42 and the transistor 37 which is now conductive. The charging current I thereof can be obtained, if the voltage of the smoothing capacitor 30 is assumed as V, from the following formula:

$$I = V/R_{42}$$

Further, when the trailing end 1b of the light sensitive sheet 1 has just passed through the position 18, the reflected light beam into the photo-transistor 20 is simultaneously shut off, thereby both transistors 37 and 36 become non-conductive, and the transistor 39 becomes conductive, in that the current of the capacitor 40 is grounded.

In the trigger circuit C, the output of the secondary wiring 25 of transformer 22 is rectified by a rectifier 47 and charged via a resistor 48 to a capacitor 46 to provide a trigger signal. Connected in parallel with trigger capacitor 46 is a circuit comprising the primary winding 50 of a pulse transformer 49 and a silicon control rectifier element (SCR) 43 connected in series, and the other end of capacitor 46 is grounded at 45.

The gate of silicon control rectifier element 43 is connected to the other terminal of capacitor 40 within the detecting circuit, and also to ground via a resistor 44.

One end of the secondary wiring 51 of pulse transformer 49 is grounded at 63, and its other end is connected to each of the respective electrodes 52a and 52b of two electronic flash tubes 11a and 11b which are connected in series with each other and connected to an ignition capacitor 60 within ignition circuit D.

In the ignition circuit D, the primary winding 54 of a voltage increasing transformer 53 is connected to commercial power source 21, and the output of its secondary winding 55 is full-wave rectified by means of silicon rectifier elements 56, and 57, 58 and 59, then applied to ignition capacitor 60 of which one end is grounded at.

Connected in parallel with ignition capacitor 60 are two electronic flash tubes 11a, 11b and a choke 62, which are all connected in series with each other.

Consequently, when the capacitor 40 is supplied with a current I, the resistor 44 is provided with a voltage which is applied to the gate of the silicon control rectifier element 43, so that SCR 43 becomes conductive, accordingly, the high voltage which is thereby charged on trigger capacitor 46 causes a current through the primary winding 50 of the pulse transformer 49, and the current generates in the secondary wiring 51 thereof a higher voltage (10 kilovolts or more) which is applied to trigger electrodes 52a and 52b The charging voltage of several kilovolts on capacitor 60 causes a current pass through the electronic flash tubes 11a and 11b which are thereby ignited so that an exposure is carried out.

All operations from the detection through the ignition described heretofore are fully carried out instantaneously and electronically, accordingly, so far as the position 18 is adequately selected, the light sensitive sheet 1 is properly situated so as to be located at its correct position with respect to the image aperture 7. Further the original sheet 2 which moves synchronously with the light sensitive sheet 1 is also situated properly so as to have its foremost and aftermost ends 2a and 2b located at their correct positions with respect to the exposure transparent plates. Thereby, an accurate exposure is accordingly carried out.

I claim:

1. Duplicating apparatus of the type wherein both original and copy documents are carried in continuous, non-stop movement respectively through an exposure position and an image position, and including means for projecting an image from said exposure position to said image position, comprising:

means for continuously carrying an original document along a first carrier path to traverse said exposure position;

means for continuously carrying light sensitive sheets cut to a predetermined size along a second carrier path spaced from said first carrier path and with the same velocity as said original document whereby a respective one of said light sensitive sheets is within said image position simultaneously with said original document within said exposure position;

means for determining the presence of said respective light sensitive sheet within said image position, said means including means for projecting a light beam to said image position, said light beam having an energy spectrum different than the energy spectrum for sensitizing said light sensitive sheets, and means for receiving light reflected from a light sensitive sheet at said image position and generating an output signal;

means responsive to said output signal for generating a trigger signal indicating that said respective light sensitive sheet is within said image position; and means for exposing the original document at said exposure position with an instantaneous light flash and actuated by said trigger signal whereby said respective light sensitive sheet receives said projected image at said image position.

2. Duplicating apparatus as in claim 1 wherein said light beam is restricted to a spot beam and is projected to a point within said image position whereby light is reflected from the leading edge portion of said respective light sensitive sheet within said image position.

3. Duplicating apparatus as in claim 2 wherein said means for receiving light is a phototransistor and said means for generating a trigger signal includes a silicon control rectifier, a pulse transformer having a primary winding connected in the anode-cathode circuit of said silicon control rectifier and a secondary winding for transmitting a signal for actuating said means for exposing, means for generating a current in response to the output of said phototransistor, and means for integrating said current and connected to the gate of said silicon control rectifier whereby said silicon control rectifier is actuated with said respective light sensitive sheet within said image position.

* * * * *